Patented June 6, 1933

1,912,590

UNITED STATES PATENT OFFICE

WILLIAM S. MURRAY, OF UTICA, NEW YORK, ASSIGNOR TO ONEIDA COMMUNITY, LIMITED, OF ONEIDA, NEW YORK, A CORPORATION OF NEW YORK

INDIUM RECOVERY PROCESS

No Drawing.    Application filed April 25, 1930. Serial No. 447,410.

This invention relates to an improvement in processes for the recovery of the metal indium and the separate recovery of zinc from ores containing said metals.

In zinc recovery processes by wet methods as hitherto practised, a concentrate is prepared from the ore, as by crushing, grinding and flotation. The concentrate is then roasted to produce a calcine which is then leached with sulphuric acid, the leaching step being carried out in such a manner that the resulting solution is neutral or preferably slightly alkaline. This conversion of the acid solution to a neutral or alkaline one results in precipitating the indium as well as some other metals which thereafter accompany the solids when the latter are separated from the liquid. In such a process, it is common to grind the solids with acid and then leach. Then the resulting solids and liquids are separated and the solids sent to the refinery for the recovery of the precious metals, and copper and lead, if such metals be present in the starting materials. The acid liquid is subjected to the action of metallic zinc, and sometimes metallic iron for the purpose of removing copper and probably some arsenic and antimony from the solution, thus freeing the zinc solution from these metals. In order to insure the removal of any solids which may have accompanied the liquid and of any precipitates formed therein, the liquid is subjected to a further separation step and the solids are returned to the cycle at some preceding step of the process so that they will pass out of the cycle with the solids going to the refinery as hitherto described. The purified acid liquid is returned to the cycle for leaching more calcine.

In the process described, any indium which may be present in the ore is never recovered. It is precipitated into the solids during the leaching step, because by the time this step is completed the solution is neutral or alkaline. When the solution obtained by grinding the solids with acid, as hereinbefore referred to, is subjected to treatment with zinc and iron, the indium is precipitated and eventually goes back with the solids to a preceding stage of the cycle, finally going to the refinery where it is lost in the furnace process.

In my pending applications Serial No. 333,235 filed January 11, 1929 and Serial No. 364,011 filed May 17, 1929, I have described several processes for recovering indium and zinc from ores containing the same. In the first application, the process involves maintaining the acidity of the solution when leaching the calcine and while separating the solids from the liquid, the indium being thereafter precipitated from the acid solution by treatment with metallic zinc. In my second application, I have pointed out the advantage in some cases of carrying the leaching to the point where the zinc solution becomes neutral or alkaline, in order to rid it of metallic impurities, such as excess iron, antimony or arsenic at an early stage while also any gelatinous matter is rendered granular so that the zinc solution may be freed from it readily. In this case, the solids containing also the indium are treated to recover the indium.

It is an object of this invention to increase the efficiency of the processes to enable a greater yield of recovered indium for a given ore.

It is a further object to obtain a substantially pure zinc sulphate solution at an early stage in the process.

The purpose of roasting the concentrate is to obtain the maximum percentage of soluble indium. Considered with respect to the recovery of zinc, the roasting is also for the purpose of sending a maximum percentage of zinc into the solution, for it is only that zinc which goes into solution that may be recovered. Hence the success of the process considered with respect to the recovery of either zinc or indium depends on the roasting step.

I have discovered that if the concentrate is roasted with sulphuric acid, higher yields in indium are obtained. The presence of the sulphuric acid in the roasting process has the effect of unlocking a much greater percentage of indium and results in a tremendous increase in the recovery of this metal. While this discovery can be applied in many different recovery processes, I will now describe a particular process for the purpose of illustration.

The ore is subjected to any suitable treatment to obtain a concentrate therefrom. While this may be done in various ways, the method in general use is to crush and grind the ore and subject it to a flotation process, with the result that a concentrate is obtained containing essentially all the values.

This concentrate is then roasted with sulphuric acid. This treatment takes place in a suitable furnace, and in the presence of an oxidizing atmosphere to produce oxides and sulphates of the metals while avoiding as much as possible the production of zinc-iron compounds. The temperatures should therefore be in the order of 1100–1250 degrees F. As examples, one pound of sulphuric acid may be used with one and one quarter pounds of concentrate and roasting may take place, for about fourteen hours. The concentrate is wetted and thoroughly mixed with the acid before roasting.

The calcine from the roasting furnace is subjected to a leaching or dissolving process wherein it is brought into contact with an acid solution which may be a dilute sulphuric acid solution. As an example, about one gallon of a solution comprising water containing six tenths (0.6) pounds of sulphuric acid per gallon may be employed for every pound of calcine. This leaching may advantageously take place for about two and one quarter (2¼) hours at a temperature in the order of 175–185 degrees F. and may be performed in any known or suitable way, for example, in Pachuca tanks, as described in my pending applications referred to. When the leach is finally finished, there is a small percentage acidity remaining in the solution.

During the leaching process, those of the metals soluble in the acid leaching solution are dissolved either completely or to a certain extent. The roasting of the concentrate with sulphuric acid has the pronounced effect of increasing the solubility of the indium which goes into the solution to a much greater extent than where roasting is carried on without sulphuric acid, as in prior practises.

After leaching, the solution is filtered away from the residue in any known or suitable manner, and the residue is washed and set aside for re-roasting and releaching as above. It has been found that this residue weighs about thirty percent of the original concentrate and contains about two-thirds as much indium per unit of weight as was in the original concentrate, that is, about twenty per cent of the total amount of the indium of the original concentrate, the remaining eighty percent being in the solution.

The acid solution containing the soluble metals, including the zinc, indium and other metals, such for example, as copper, arsenic, antimony, iron and lead (depending on the original character of the ore) is now treated with wash water, for example, about one gallon, more or less, for each pound of calcine treated. The resulting solution contains about one percent of sulphuric acid.

The solution is now rendered neutral and advantageously decidedly alkaline to throw down all metals except the zinc. To this end, the solution is treated with small mesh zinc and agitated with live steam until the free acid is practically neutralized. Zinc oxide is now added to completely neutralize any remaining acid and to make the solution slightly but distinctly alkaline.

This slightly alkaline solution containing a zinc-zinc oxide sludge is now filtered in any known or suitable manner, for example, in the manner described in my pending application referred to, and the sludge is removed. The resulting solution contains almost pure zinc sulphate with possibly some iron and may be used without further refining. It may be sold as such, or it may be electrolyzed to produce electrolytic zinc, or it may be treated with calcium chloride to produce zinc chloride and calcium sulphate for commerce. The process thus produces a commercial zinc sulphate at an early stage.

This solution may be further purified, however, by eliminating the iron. To this end, the solution containing zinc sulphate and iron sulphate in neutral condition is oxidized by heating and aeration and iron hydroxide is precipitated and filtered out.

The zinc-zinc oxide sludge taken from the solution as above stated, is to be treated to recover the indium. It is first treated with a hot acid, such as sulphuric acid, nitric acid, or a mixture of nitric and sulphuric acids, until all but a silica insoluble residue is dissolved. The solution is removed, as by filtering, from the residue which is thrown away.

This solution, now free of silica, is next advantageously made alkaline and, in this practical example, it is first partly neutralized by a cheap caustic, such as caustic soda, which tends to precipitate the zinc as zinc hydroxide, whereupon the solution is finally treated with ammonia until the zinc hydroxide is redissolved. This treatment throws down all the metals from the solution except the zinc and copper which remain in solution. The solution is filtered and the filter cake which contains the indium removed. The solution is discharged and may be sent to evaporators for drying and the dried residue sent to the metallic residue dump.

The filter cake is next refined to purify the indium further. To this end, it is first dissolved in either sulphuric or hydrochloric acid, preferably the former, because it is cheaper, and then treated with an excess of hydrogen sulphide gas which throws down any traces of metallic impurities such as copper and lead. The solution is now filtered and the filter cake containing the metallic impurities is sent to the metallic residue dump.

The purified solution is now freed of hydrogen sulphuric gas by heating or aerating or by a combination of the two. The indium is purified further by again making the solution basic, for example, by a treatment with fine mesh zinc, followed with zinc oxide. This treatment causes the indium to precipitate out and the solution is removed from the precipitate by filtering, the filtered solution being discharged to waste.

The filter cake containing the indium is now further purified by dissolving in nitric acid and the acid solution again neutralized and made basic by addition of an excess of ammonia. The solution is filtered, the filtered solution discarded and the precipitate which is highly purified indium (except for a small amount of iron which may have followed through) set aside. The indium may be recovered by an electrolytic process, for example, by treating the precipitate in sulphuric or hydrochloric acid until dissolved and then by electroplating out from the solution the indium which is thus obtained very nearly pure.

What is claimed is:

1. The method of recovering indium from an ore containing the same which comprises forming a concentrate from said ore, roasting said concentrate in an oxidizing atmosphere with sulphuric acid to form a calcine, leaching the calcine, and treating the solution to obtain the indium.

2. The method of recovering indium from an ore containing the same which comprises forming a concentrate from said ore, roasting said concentrate in an oxidizing atmosphere with sulphuric acid at a temperature in the order of 1100–1250° F. and for a period in the neighborhood of 14 hours thereby to form a calcine, leaching the calcine, and treating the solution to obtain the indium.

3. The method of recovering indium from an ore containing the same which comprises forming a concentrate from said ore, roasting said concentrate in an oxidizing atmosphere with sulphuric acid to form a calcine, leaching the calcine while maintaining the acidity of the solution, filtering the solution and washing the residue with water, neutralizing the solution with zinc and then rendering the solution alkaline with zinc oxide, filtering the alkaline solution and treating the residue with acid until all but an insoluble silica residue is dissolved, discarding the residue, treating the solution with caustic and then with ammonia, filtering and dissolving the residue in acid, treating the solution with an excess of hydrogen sulphide gas, filtering and freeing the solution of hydrogen sulphide gas, again treating the solution with zinc and zinc oxide to render the same slightly alkaline, filtering, dissolving the residue in acid and treating with an excess of ammonia, filtering, dissolving the precipitate in acid, and plating out the indium therefrom.

4. The method of recovering indium from an ore containing the same which comprises forming a concentrate from said ore, roasting said concentrate in an oxidizing atmosphere with sulphuric acid to form a calcine, leaching the calcine while maintaining the acidity of the solution, filtering the solution and washing the residue with water, neutralizing the solution with zinc and then rendering the solution alkaline with zinc oxide, filtering the solution and treating the residue to recover the indium.

In testimony whereof, I have hereunto set my hand.

WILLIAM S. MURRAY.